United States Patent
Marume et al.

(10) Patent No.: US 6,397,119 B1
(45) Date of Patent: May 28, 2002

(54) SEMICONDUCTOR MANUFACTURING SYSTEM FOR SIMULTANEOUS PROCESSING OF PRESCRIBED NUMBER OF LOTS

(75) Inventors: Yasuhiro Marume; Ryuji Takechi; Masaki Ootani; Takamasa Inobe; Katuya Oota; Yasuhiro Satou, all of Hyogo (JP)

(73) Assignees: Mitsubishi Denki Kabushiki Kaisha, Tokyo; Ryoden Semiconductor System Engineering Corporation, Hyogo, both of (JP)

( * ) Notice: Subject to any disclaimer, the term of this patent is extended or adjusted under 35 U.S.C. 154(b) by 0 days.

(21) Appl. No.: 09/354,094

(22) Filed: Jul. 15, 1999

(30) Foreign Application Priority Data

Feb. 2, 1999 (JP) .............................. 11-024795

(51) Int. Cl.$^7$ .............................................. G06F 19/00
(52) U.S. Cl. .......................................... 700/121; 700/99
(58) Field of Search .................................. 700/121, 112, 700/106, 107, 99, 100, 102, 115, 116, 97, 101; 438/14

(56) References Cited

U.S. PATENT DOCUMENTS

| | | | | |
|---|---|---|---|---|
| 5,867,388 A | * | 2/1999 | Okumura et al. ............. | 700/112 |
| 5,930,137 A | * | 7/1999 | Togashi ....................... | 700/100 |
| 5,976,199 A | * | 11/1999 | Wu et al. .................... | 29/25.01 |
| 5,980,591 A | * | 11/1999 | Akimoto et al. ............ | 29/25.01 |
| 6,148,246 A | * | 11/2000 | Kawazome ................. | 700/121 |
| 6,192,291 B1 | * | 2/2001 | Kwon .......................... | 700/121 |
| 6,259,961 B1 | * | 7/2001 | Inoue et al. ................. | 700/112 |
| 6,269,279 B1 | * | 7/2001 | Todate et al. ............... | 700/121 |

FOREIGN PATENT DOCUMENTS

JP          9-148210          6/1997

* cited by examiner

Primary Examiner—William Grant
Assistant Examiner—Zoila Cabrera
(74) Attorney, Agent, or Firm—McDermott, Will & Emery

(57) ABSTRACT

A semiconductor manufacturing system having a high processing efficiency and a high product output includes a processing device for simultaneously processing a prescribed number of lots for which it is reserved, and a semiconductor manufacturing system control device connected to the processing device for managing the manufacturing steps. The semiconductor manufacturing system control device includes a lot processing step managing portion for managing the processing steps of the lots and determining whether the lots have arrived at the step of being processed by the processing device; a lot securing portion, connected to the lot processing step managing portion, for selecting, when the lots have arrived at the step of being processed by the processing device, a prescribed number of lots to be processed by the processing device under the same processing condition as the lots, instructing an operator to secure the prescribed number of lots selected, and determining whether the prescribed number of lots are secured; and a lot reservation portion connected to the lot securing portion and the processing device for reserving the processing device for the processing of the prescribed number of lots secured when the prescribed number of lots are secured. The processing device includes a portion connected to the semiconductor manufacturing system control device for processing the prescribed number of lots for which it is reserved.

18 Claims, 4 Drawing Sheets

SEMICONDUCTOR MANUFACTURING SYSTEM FOR SIMULTANEOUS PROCESSING OF PRESCRIBED NUMBER OF LOTS

BACKGROUND OF THE INVENTION

1. Field of the Invention

The present invention relates to a semiconductor manufacturing system and a semiconductor manufacturing system control device for use in the semiconductor manufacturing system, and more particularly, to a semiconductor manufacturing system capable of processing effectively with a processing device and to a semiconductor manufacturing system control device for use in such system.

2. Description of the Background Art

Various steps are involved in a semiconductor manufacturing line. The order in which the steps are performed varies depending on the lots. Thus, an operator has managed the steps according to the lots, and has provided the lots to an appropriate processing device. It is, however, possible, with a diffusion device for forming an impurity diffusion layer on the semiconductor manufacturing line, to process simultaneously a plurality of lots having the same conditions under which they are processed. Therefore, conventionally, the line operator would select the plurality of lots to be processed in the diffusion device and provide them into the diffusion device.

Moreover, when the processing in the diffusion device is completed, the lots are provided to a processing device (for example, for a photographic step or a chemical treatment step to embed the pattern) and undergo a prescribed processing. Beside these lots, a monitor lot (or a lot for an inspection of the diffusion process) is taken out from the diffusion device, and the monitor lot is inspected (for instance, to measure the film thickness) with the diffusion inspection device. When abnormality in quality is detected in the inspection of the monitor lot, the operator finds the lots undergoing the next processing step, and interrupts the processing for the lots.

The lots, however, are subjected to various processing based on their various step schedules. As a result, much time was required to select the lots having the same processing conditions upon the provision of the lots into the diffusion device. In addition, in the attempt to select the lots, there were times when lots having a different set of processing conditions were selected by mistake. Further, when a line operator is selecting the lots, the diffusion process may possibly be performed for a fewer number of lots than the maximum capacity of the diffusion device, which is inefficient. As a consequence, the processing efficiency was poor, and the product output was low.

Conventionally, the step preceding the diffusion step is a wet step in which a semiconductor wafer is immersed in a chemical. If the lots are not provided to the diffusion device immediately after the completion of the wet step, a natural oxide film forms on the surface of the semiconductor wafer. When the applied chemical is dry, the semiconductor wafer may no longer be suitable for use, leading to a possible reduction in the yield. In the above-described method in which a line operator manages the step schedules according to the lots, it was difficult to provide the lots to the diffusion device after the completion of the wet step in a short time.

If abnormality in quality is detected in the inspection of the monitor lot after the diffusion processing step, the lots undergoing the next processing step must be found, and the processing for the lots must be interrupted. It has become a problem that finding these lots took considerable time.

SUMMARY OF THE INVENTION

The present invention was made to solve the above problems. One object of the present invention is to provide a semiconductor manufacturing system having a high processing efficiency and a high product output.

Another object of the present invention is to provide a semiconductor manufacturing system capable of increasing the work efficiency of the operator.

A further object of the present invention is to provide a semiconductor manufacturing system having a high product yield.

According to one aspect of the present invention, a semiconductor manufacturing system control device is used in a semiconductor manufacturing system including a processing device for simultaneously processing a prescribed number of lots for which it is reserved, and a semiconductor manufacturing system control device connected to the processing device for managing the manufacturing steps. The semiconductor manufacturing system control device includes a lot processing step managing portion for managing the processing steps of the lots and determining whether the lots have arrived at the step of being processed by the processing device; a lot securing portion, connected to the lot processing step managing portion, for selecting, when the lots have arrived at the step of being processed by the processing device, a prescribed number of lots to be processed by the processing device under the same processing condition as the lots, instructing an operator to secure the prescribed number of lots selected, and determining whether the prescribed number of lots are secured; and a lot reservation portion connected to the lot securing portion and the processing device for reserving the processing device for the processing of the prescribed number of lots secured when the prescribed number of lots are secured.

The semiconductor manufacturing system control device secures the prescribed number of lots to be processed by the processing device in advance and reserves the processing device. The processing device processes the lots for which it is reserved. In this way, the processing device can always process the maximum number of lots it is capable of processing. In addition, processing of inappropriate lots can be prevented, leading to an effective processing, an increase in the product output, and an improved yield. Moreover, since the lots to be processed by the processing device is secured in advance, an operator can speedily provide the lots to the processing device. Therefore, the work time is reduced.

The semiconductor manufacturing system preferably further includes a stocker for storing the lots. The semiconductor manufacturing system control device further includes a work instruction portion for instructing the operator to hold in the stocker closest to the processing device the prescribed number of lots secured.

The lots are first collected in the stocker. Thus, by taking out the lots from the stocker and providing them to the processing device, the mistake the operator might make in providing the lots to the processing device can be eliminated, the work time is reduced, and the product yield is improved.

Preferably, the processing device further includes a request signal transmission portion connected to the semiconductor manufacturing system control device for transmitting to the semiconductor manufacturing system control device a request signal for requesting a prescribed number of lots when the processing of lots becomes possible, and a lot processing portion connected to the lot reservation portion for simultaneously processing the prescribed number of lots for which the reservation is made. The lot reservation portion includes a secured lot reservation portion connected to the lot securing portion and the processing device for reserving the processing device, when the prescribed number of lots are secured and the request signal is received, for the processing of the prescribed number of lots secured.

The processing of the lots is reserved according to the request signal from the processing device. Therefore, the operator can provide the lots to the processing device when the lots are secured and are ready for processing. Thus, the work time can be reduced.

Preferably, the semiconductor manufacturing system further includes an inspection device for inspecting the lots processed by the processing device. The semiconductor manufacturing system control device further includes a deterring portion connected to the inspection device for deterring the processing for the prescribed number of lots if a defect is found in the lots according to the result of the inspection with the inspection device.

The lots are advanced to the next respective steps only when it is decided that no defect is found as a result of the inspection with the inspection device. Thus, the operator can quickly deal with the problem when abnormality of product is detected, and a higher processing efficiency is achieved.

According to another aspect of the present invention, a semiconductor manufacturing system includes a processing device for simultaneously processing a prescribed number of lots for which it is reserved, and a semiconductor manufacturing system control device connected to the processing device for managing the manufacturing steps. The semiconductor manufacturing system control device includes a lot processing step managing portion for managing the processing steps of the lots and determining whether the lots have arrived at the step of being processed by the processing device; a lot securing portion, connected to the lot processing step managing portion, for selecting, when the lots have arrived at the step of being processed by the processing device, a prescribed number of lots to be processed by the processing device under the same processing condition as the lots, instructing an operator to secure the prescribed number of lots selected, and determining whether the prescribed number of lots are secured; and a lot reservation portion connected to the lot securing portion and the processing device for reserving the processing device for the processing of the prescribed number of lots secured when the prescribed number of lots are secured. The processing device includes a portion connected to the semiconductor manufacturing system control device for processing the prescribed number of lots for which it is reserved.

The semiconductor manufacturing system control device secures the prescribed number of lots to be processed by the processing device in advance and reserves the processing device. The processing device processes the lots for which it is reserved. In this way, the processing device can always process the maximum number of lots it is capable of processing. In addition, processing of inappropriate lots can be prevented, leading to an effective processing, an increase in the product output, and an improved yield. Moreover, since the lots to be processed by the processing device is secured in advance, an operator can speedily provide the lots to the processing device. Therefore, the work time is reduced.

According to a further aspect of the present invention, a method of controlling a semiconductor manufacturing system is a method for a semiconductor manufacturing system control device used in a semiconductor manufacturing system including a processing device for simultaneously processing a prescribed number of lots for which it is reserved, and a semiconductor manufacturing system control device connected to the processing device for managing the manufacturing steps. The method of controlling a semiconductor manufacturing system includes a step of determining whether the lots have arrived at the step of being processed by the processing device, a step of selecting, when the lots have arrived at the step of being processed by the processing device, a prescribed number of lots to be processed by the processing device under the same processing condition as the lots, instructing an operator to secure the prescribed number of lots selected, and determining whether the prescribed number of lots are secured, and a step of reserving the processing device for the processing of the prescribed number of lots secured when the prescribed number of lots are secured.

The semiconductor manufacturing system control device secures the prescribed number of lots to be processed by the processing device in advance and reserves the processing device. The processing device processes the lots for which it is reserved. In this way, the processing device can always process the maximum number of lots it is capable of processing. In addition, processing of inappropriate lots can be prevented, leading to an effective processing, an increase in the product output, and an improved yield. Moreover, since the lots to be processed by the processing device is secured in advance, an operator can speedily provide the lots to the processing device. Therefore, the work time is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An semiconductor manufacturing system representing one embodiment of the present invention will be described below with reference to the drawings.

Figure 1:
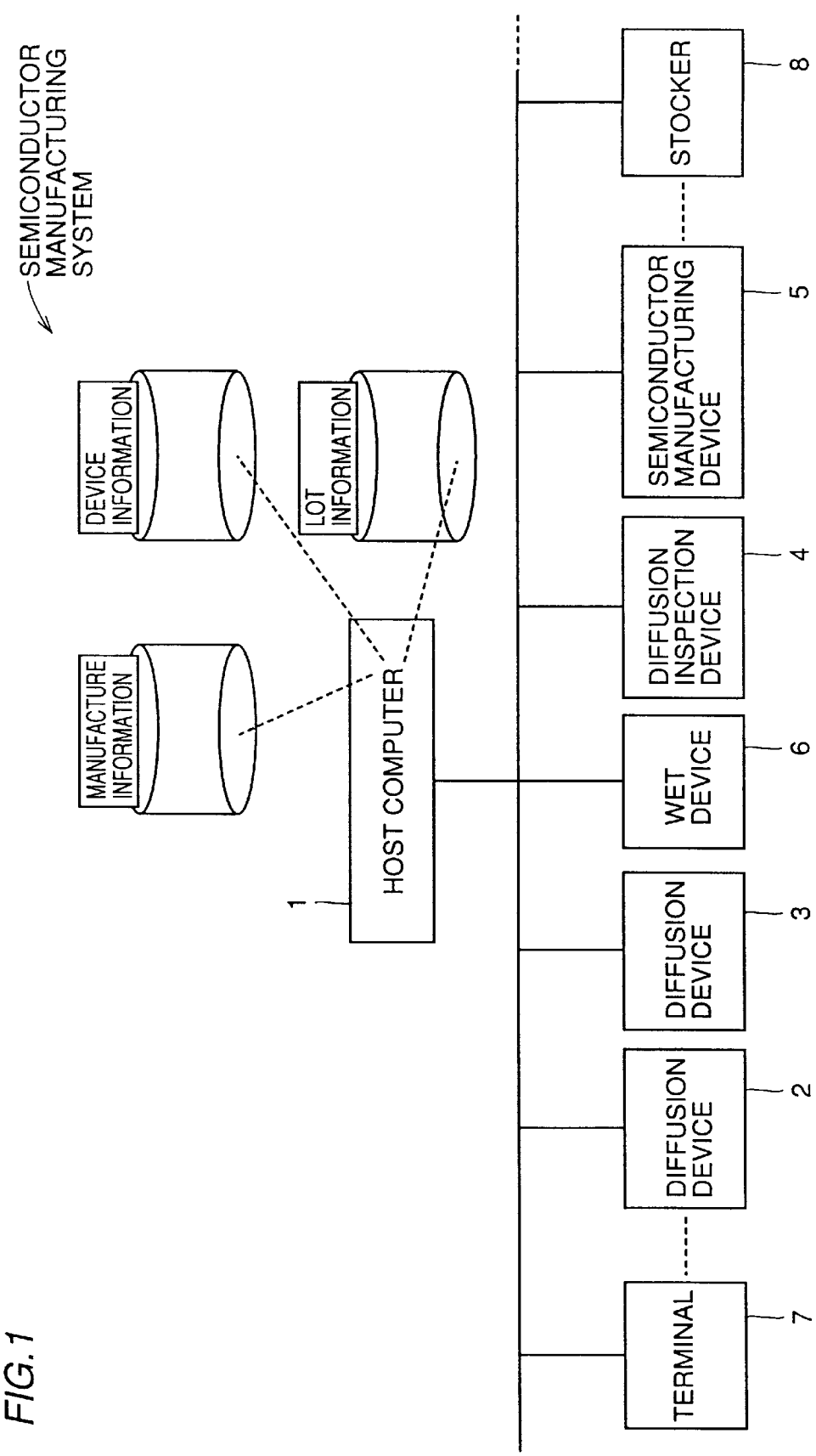
FIG. 1 is a diagram representing a configuration of a semiconductor manufacturing system according to an embodiment of the present invention.

In FIG. 1, the semiconductor manufacturing system includes a host computer 1 for managing the manufacturing steps of the semiconductor device, diffusion devices 2 and 3 for processing a semiconductor wafer included in a lot to form an impurity diffusion layer, a diffusion inspection device 4 for inspecting the quality of the lot processed in diffusion devices 2 and 3, a wet device 6 for immersing in a chemical the semiconductor wafer included in the lot, a semiconductor manufacturing device 5 for subjecting the lot to various processes other than those performed in diffusion devices 2 and 3 and wet device 6, a stocker 8 for temporarily storing the lot, and a terminal 7 for displaying a message to give an instruction to an operator and to receive from the operator an instruction for host computer 1. Each portion of the semiconductor manufacturing system is wire-connected or wireless-connected and data transmission and reception take place as required.

Host computer 1 manages the manufacture information, the device information, and the lot information necessary for the semiconductor manufacture. Manufacture information is information representing the order in which the manufacturing steps are carried out using various devices included in the semiconductor manufacturing system. Device information is information representing the types of devices required for each manufacturing step. Lot information is information relating to the lots, such as the in-process data of the lots which are in stocker 8. The in-process data includes information relating to a lot number, to a current step of each lot, and to a stocker in which a lot is being stored. The operator can obtain these different kinds of information by accessing host computer 1 via terminal 7.

Figure 2:
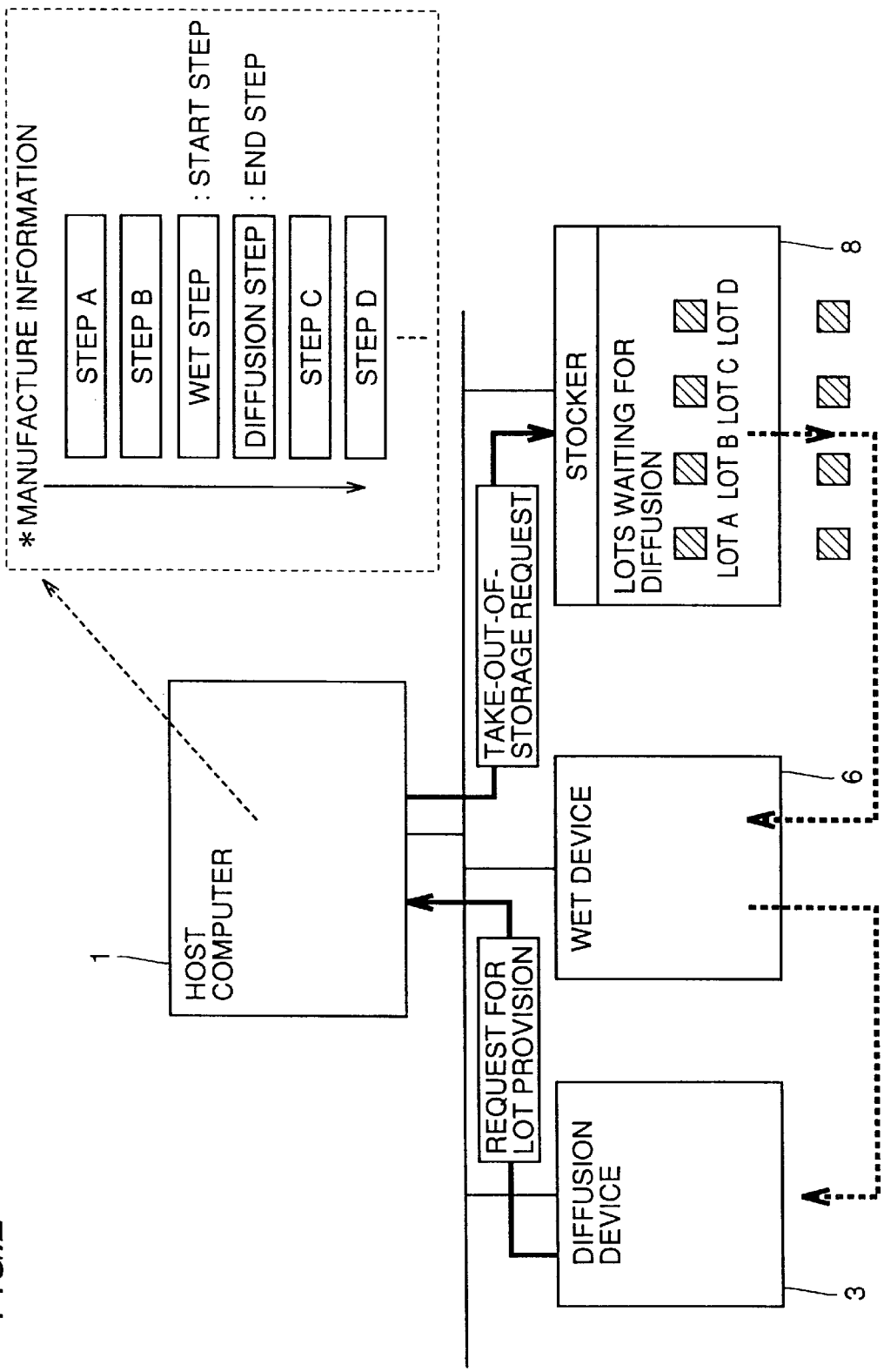
FIG. 2 is a diagram illustrating a semiconductor manufacturing process.
Figure 3:
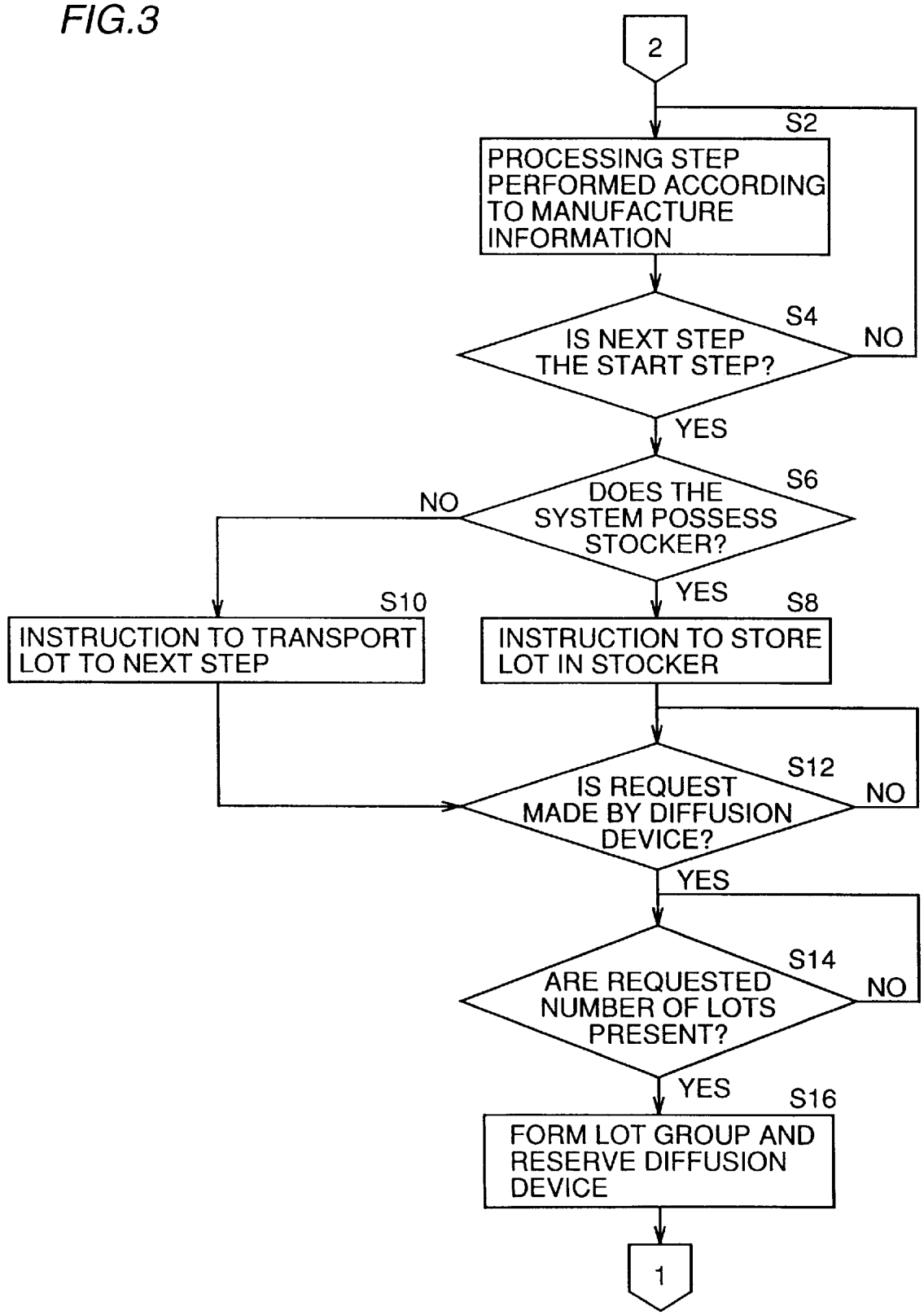
FIGS. 3 and 4 are flow charts for the semiconductor manufacturing process.
Figure 4:
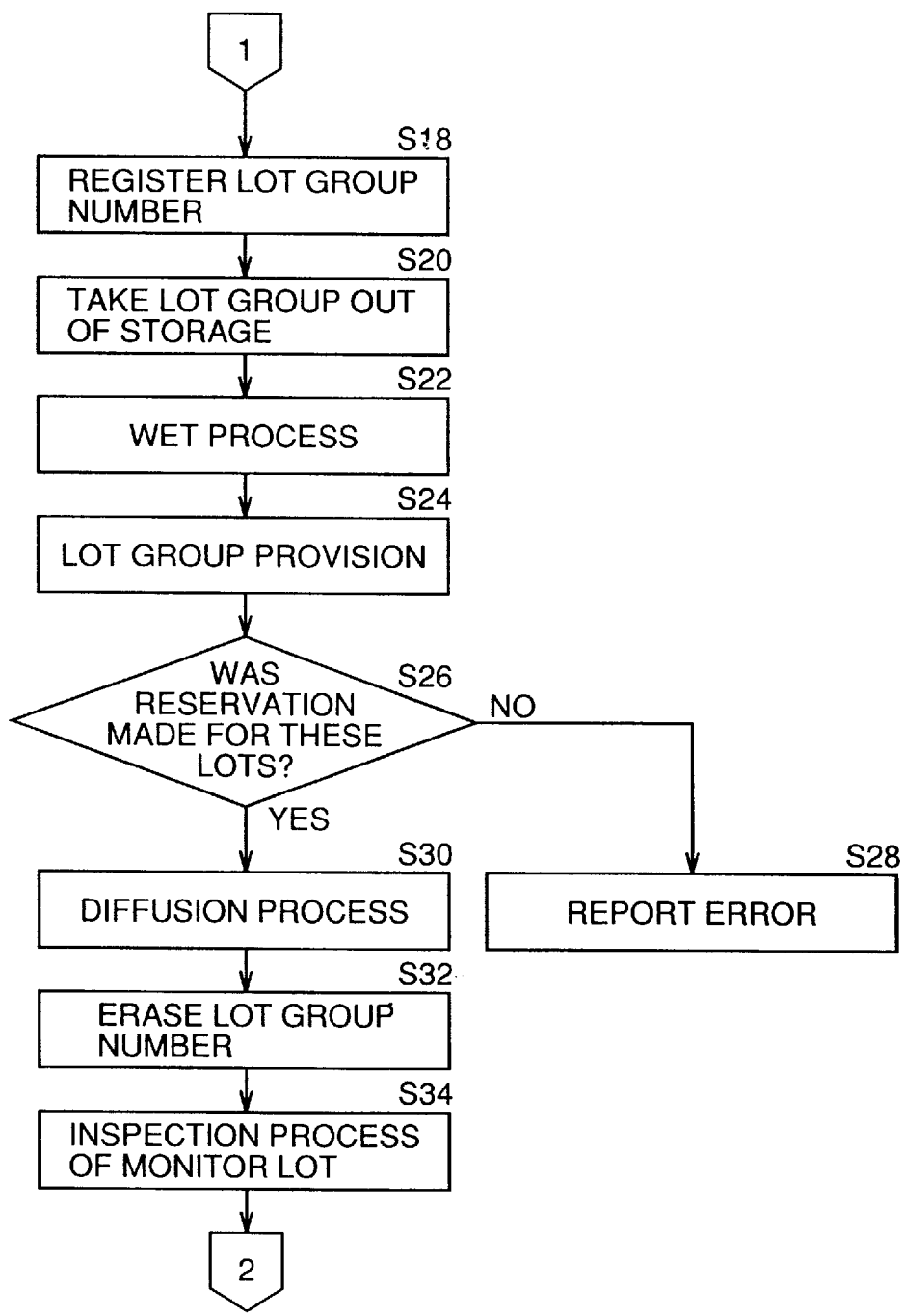

The semiconductor manufacturing process in the semiconductor manufacturing system Will be described with reference to FIGS. 2 to 4. Manufacture information shown in FIG. 2 represents the processing steps of a lot among a plurality of lots. FIGS. 3 and 4 are flow charts of the semiconductor manufacturing process for that lot. A prescribed number of lots as one set hereinafter referred to as a "lot group") are subjected to the wet step and to the following diffusion step. Moreover, the first step and the last step of processing for the lot group are referred to as the start step and the end step.

Host computer 1 manages a lot and decides the processing steps and the devices for that lot based on the manufacture information and the device information. Each processing step is performed according to an instruction from host computer 1 (S2).

After the processing in S2, host computer 1 determines whether the next step is the start step or not (S4). If the next step is not the start step (NO at S4), then the processing in S2 is repeated.

Next, host computer 1 determines whether the semiconductor manufacturing system possesses a stocker (S6). If the semiconductor manufacturing system is of the kind that possesses a stocker (YES at S6), then host computer 1 stores a lot in the specified location in preparation for the diffusion step, and updates the lot information (S8). For instance, if the specified location is stocker 8, host computer 1 instructs the operator via terminal 7 to store the lot in stocker 8. Then, the in-process data for the lot in stocker 8 is updated. If the semiconductor manufacturing system includes a plurality of stockers 8 and a transportation system (not shown) for transporting a lot between stockers 8, host computer 1 instructs the transportation system to transport the lot to a prescribed stocker 8. When the transportation is completed, host computer 1 updates the in-process data for lots in stocker 8.

If the semiconductor manufacturing system does not possess any stocker (NO at S6), host computer 1 instructs the operator via terminal 7 to transport the lot to be processed in the wet step close to wet device 6(S10).

Diffusion device 3 makes a request for lots provision to host computer 1 when the processing of the lots becomes possible. Host computer 1 stands by until a request for the lots is made by diffusion device 3 (S12). The wet step and the diffusion step are successive steps. Moreover, the processing time in wet device 6 is much shorter than the processing time in diffusion device 3, and the wet device 6 has a high throughput. Therefore, diffusion device 3 makes the request for the lots for both devices so that wet device 6 never makes a request for the lots.

If a request is made by diffusion device 3 (YES at S12), then host computer 1 retrieves from the in-process data the data for the lot to be processed in diffusion device 3, and examines whether the number of lots (lot group) specified by the manufacture information are all present (S14). If the lot group is complete (YES at S14), then host computer 1 reserves the lot group to be processed in diffusion device 3 (S16). The reservation of the lot group leads to the reservation of diffusion device 3 for the lots to be processed next.

If host computer 1 fails to secure the number of lots specified by the manufacture information (NO at S14), then host computer 1 stands by until the specified number of lots are secured. When the lots are secured, host computer 1 forms a lot group from the specified number of lots secured and reserves diffusion device 3 for the lot group to be processed in diffusion device 3.

If the specified number for a lot group cannot be secured even after a predetermined time, host computer 1 may form a lot group with the number of lots secured and make the reservation. Alternatively, host computer 1 may report the failure to secure the lot group to the operator via terminal 7. Upon receiving the report, the operator forms a lot group from the number of lots secured via terminal 7 and determines whether to make a reservation or not. Further, if host computer 1, when checking the in-process condition of the preceding step, finds that lots are not being processed in the preceding step, the lot group may be formed from the lots that have been secured up to that point.

After making the reservation for the lot group, host computer 1 registers therein the lot group number (S18).

Host computer 1 transmits a take-out-of-storage request for the lot group to stocker 8. In response to the take-out-of-storage request, stocker 8 takes the lot group out of storage (S20).

The operator provides the lot group to wet device 6, and the lot group is processed in wet device 6 (S22). Thereafter, the operator provides the lot group to diffusion device 3 (S24). Upon each provision of the lot group, the operator reports the provision to host computer 1 via terminal 7.

When receiving the report, host computer 1 checks whether the lots about to be provided to diffusion device 3 are the lots for which the reservation of diffusion device 3 was made. Moreover, host computer 1 checks to see whether the lots about to be provided to diffusion device 3 are actually next scheduled to be processed in the diffusion step. If the lots about to be provided to diffusion device 3 are not those for which the reservation is made, or if the next processing step for the lots is not the diffusion step (NO at S26), then host computer 1 does not instruct diffusion device 3 to start processing, but instead, reports the error via terminal 7 (S28). The operator may obtain such information via terminal 7.

If the lots about to be provided to diffusion device 3 are those for which the reservation is made (YES at S26), then the monitor lot prepared in advance in diffusion device 3 and the lot group are subjected to the diffusion process (S30). According to the manufacture information shown in FIG. 2, the diffusion step is the last step in which the lots as a lot group is processed. Thus, host computer 1, when receiving the report of processing completion from diffusion device 3, breaks up the lot group. In other words, the lot group number is erased (S32). Thereafter, diffusion inspection device 4 carries out inspections, such as film thickness measurement, of the monitor lot, and reports the inspection results to host computer 1 (S34). Host computer 1 receives the inspection results and compares the inspection results actually reported from diffusion inspection device 4 with the standard value ranges of the inspection step being set in the manufacture information. If the inspection results fall within the standard value ranges, host computer 1 subjects the lots included in the lot group to a prescribed processing according to the manufacture information in order to advance each lot included in the lot group to the next step. If the inspection results fail to fall within the standard value ranges, host computer 1 keeps each lot included in the lot group from going on to the next step, and further, reports this failure to the operator via terminal 7.

Then, going back to S2, each lot included in the lot group is separately subjected to a different processing.

Diffusion device 3 can make a request for the lots to host computer 1 even if the processing of the preceding lots is not finished. This is because the processing of the preceding lots may be already finished in diffusion device 3 at the time of completion of the processing in wet device 6 depending upon the timing with which the lots are provided to wet device 6, since the lots are provided to wet device 6 before the lots are provided to diffusion device 3. Thus, the occupancy of the device can be increased.

If diffusion device 3 is of the type that does not make a request for the lots, host computer 1 calculates the timing for the lot provision to diffusion device 3 based on the lot information and the manufacture information and displays the calculated result on terminal 7. By referring to the display on terminal 7, the operator can provide the lots to diffusion device 3 without making a mistake.

As seen from above, the management of the lots in a lot group allows lots to be provided to diffusion device 3 without a mistake.

In addition, all information relating to each lot is managed in host computer 1. Thus, the operator can obtain accurate information with regard to the lots via terminal 7 and speedily provide the lots to diffusion device 3. Moreover, even when the operator provides an inappropriate lot to diffusion device 3 by mistake, host computer 1 immediately reports the error via terminal 7. Thus, provision of inappropriate lots to diffusion device 3 by the operator can be prevented, which leads to a more effective processing by each device, an increase in output and in the lot yield, and a reduction in the work time.

Although in the above-described example, the operator provides the transportation between the devices, the transportation may be automated. For instance, for each device, a corresponding stocker 8 may be provided, and each device may take out the lots from its corresponding stocker 8 and store the lots in the same stocker 8 after processing is completed. The transportation between stockers 8 may be provided by an automatic transporting vehicle or the like. In addition, the lots may be automatically transported between a device and stocker 8.

Although the present invention has-been described and illustrated in detail, it is clearly understood that the same is by way of illustration and example only and is not to be taken by way of limitation, the spirit and scope of the present invention being limited only by the terms of the appended claims.

What is claimed is:

1. A semiconductor manufacturing system control device used in a semiconductor manufacturing system including a processing device for simultaneously processing a prescribed number of lots for which the processing device is received and the semiconductor manufacturing system control device connected to said processing device for managing manufacturing steps, comprising:
   a lot processing step managing portion for managing processing steps of the lots and determining whether said lots have arrived at a step of being processed by said processing device;
   a lot securing portion, connected to said lot processing step managing portion, for selecting, when said lots have arrived at the step of being processed by said processing device, said prescribed number of lots to be processed by said processing device under a same processing condition as said lots, instructing an operator to secure said prescribed number of lots selected, and determining whether said prescribed number of lots are secured; and
   a lot reservation portion connected to said lot securing portion and said processing device for reserving said processing device for processing of said prescribed number of lots secured when said prescribed number of lots are secured.

2. The semiconductor manufacturing system control device according to claim 1, wherein
   said semiconductor manufacturing system further includes a stocker for storing the lots;
   said semiconductor manufacturing system control device further comprising a work instruction portion for instructing an operator to hold in said stocker closest to said processing device said prescribed number of lots secured.

3. The semiconductor manufacturing system control device according to claim 1, wherein said processing device further includes
   a request signal transmission portion connected to said semiconductor manufacturing system control device for transmitting to said semiconductor manufacturing system control device a request signal for requesting said prescribed number of lots when processing of lots becomes possible, and
   a lot processing portion connected to said lot reservation portion for simultaneously processing said prescribed number of lots for which a reservation is made;
   said lot reservation portion including a secured lot reservation portion connected to said lot securing portion and said processing device for reserving said processing device, when said prescribed number of lots are secured and said request signal is received, for processing of said prescribed number of lots secured.

4. The semiconductor manufacturing system control device according to claim 1, wherein said lot reservation portion includes
   a lot processing portion connected to said lot securing portion and said processing device for reserving said processing device for processing of said prescribed number of lots secured if said prescribed number of lots are secured by said lot securing portion, and
   a secured lot reservation portion connected to said lot securing portion and said processing device for reserving said processing device for processing of a number of lots that have been secured up to that point if said prescribed number of lots cannot be secured by said lot securing portion after a prescribed period of time.

5. The semiconductor manufacturing system control device according to claim 1, wherein said processing device includes a transmission portion connected to said semiconductor manufacturing system control device for transmitting information relating to lots to be processed to said semiconductor manufacturing system control device, and a lot processing portion connected to said lot reservation portion for simultaneously processing a prescribed number of lots for which a reservation is made;

said semiconductor manufacturing system control device further comprising a deterring portion connected to said processing device for determining whether the lots to be processed are those for which said processing device has been reserved and deterring processing of said lots if said processing device is not reserved for said lots.

6. The semiconductor manufacturing system control device according to claim 1, wherein said semiconductor manufacturing system further includes an inspection device for inspecting lots processed by said processing device;

said semiconductor manufacturing system control device further comprising a deterring portion connected to said inspection device for deterring processing for said prescribed number of lots if a defect is found in the lots according to a result of inspection with said inspection device.

7. A semiconductor manufacturing system, comprising:

a processing device for simultaneously processing a prescribed number of lots for which the processing device is reserved; and a semiconductor manufacturing system control device connected to said processing device for managing manufacturing steps, wherein said semiconductor manufacturing system control device includes a lot processing step managing portion for managing processing steps of lots and determining whether said lots have arrived at a step of being processed by said processing device, a lot securing portion, connected to said lot processing step managing portion, for selecting, when said lots have arrived at the step of being processed by said processing device, said prescribed number of lots to be processed by said processing device under a same processing condition as said lots, instructing an operator to secure said prescribed number of lots selected, and determining whether said prescribed number of lots are secured, and a lot reservation portion connected to said lot securing portion and said processing device for reserving said processing device for processing of said prescribed number of lots secured when said prescribed number of lots are secured;

said processing device including a lot processing portion connected to said semiconductor manufacturing system control device for processing said prescribed number of lots for which said processing device is reserved.

8. The semiconductor manufacturing system according to claim 7, further comprising a stocker for storing the lots; wherein said semiconductor manufacturing system control device further includes an instruction portion for instructing an operator to hold in said stocker closest to said processing device said prescribed number of lots secured.

9. The semiconductor manufacturing system according to claim 7, wherein said processing device includes a signal transmission portion connected to said semiconductor manufacturing system control device for transmitting to said semiconductor manufacturing system control device a request signal for requesting said prescribed number of lots when processing of lots becomes possible, and a reservation lot processing portion connected to said lot reservation portion for simultaneously processing said prescribed number of lots for which a reservation is made;

said lot reservation portion including a secured lot reservation portion connected to said lot securing portion and said processing device for reserving said processing device, when said prescribed number of lots are secured and said request signal is received, for processing of said prescribed number of lots secured.

10. The semiconductor manufacturing system according to claim 7, wherein said lot reservation portion includes a first secured lot reservation portion connected to said lot securing portion and said processing device for reserving said processing device for processing of said prescribed number of lots secured if said prescribed number of lots are secured by said lot securing portion, and a second secured lot reservation portion connected to said lot securing portion and said processing device for reserving said processing device for processing of a number of lots that have been secured up to that point if said prescribed number of lots cannot be secured by said lot securing portion after a prescribed period of time.

11. The semiconductor manufacturing system according to claim 7, wherein said processing device includes a transmission portion connected to said semiconductor manufacturing system control device for transmitting information relating to lots to be processed to said semiconductor manufacturing system control device, and a lot processing portion connected to said lot reservation portion for simultaneously processing a prescribed number of lots for which a reservation is made;

said semiconductor manufacturing system control device further including a deterring portion connected to said processing device for determining whether the lots to be processed are those for which said processing device has been reserved and deterring processing of said lots if said processing device is not reserved for said lots.

12. The semiconductor manufacturing system according to claim 7, further comprising an inspection device for inspecting lots processed by said processing device; wherein said semiconductor manufacturing system control device further includes a deterring portion connected to said inspection device for deterring processing for said prescribed number of lots if a defect is found in the lots according to a result of inspection with said inspection device.

13. A method of controlling a semiconductor manufacturing system for a semiconductor manufacturing system control device used in a semiconductor manufacturing system including a processing device for simultaneously processing a prescribed number of lots for which the processing device is reserved and a semiconductor manufacturing system control device connected to the processing device for managing manufacturing steps, comprising the steps of determining whether lots have arrived at a step of being processed by said processing device;

selecting, when said lots have arrived at the step of being processed by said processing device, said prescribed number of lots to be processed by said processing device under a same processing condition as said lots, instructing an operator to secure said prescribed number of lots selected, and determining whether said prescribed number of lots are secured; and reserving said processing device for processing of said prescribed number of lots secured when said prescribed number of lots are secured.

14. The method of controlling a semiconductor manufacturing system according to claim 13, wherein said semiconductor manufacturing system further includes a stocker for storing lots;

said method of controlling a semiconductor manufacturing system further comprising the step of instructing an operator to hold in said stocker closest to said processing device said prescribed number of lots secured.

15. The method of controlling a semiconductor manufacturing system according to claim 13, wherein said processing device further includes a request signal transmission portion connected to said semiconductor manufacturing system control device for transmitting to said semiconductor manufacturing system control device a request signal for requesting said prescribed number of lots when processing of lots becomes possible, and a lot processing portion connected to said semiconductor manufacturing system control device for simultaneously processing said prescribed number of lots for which a reservation is made;

said step of reserving for processing of said prescribed number of lots secured including reserving said processing device, when said prescribed number of lots are secured and said request signal is received, for processing of said prescribed number of lots secured.

16. The method of controlling a semiconductor manufacturing system according to claim 13, wherein said step of reserving for processing of said prescribed number of lots secured includes reserving said processing device for processing of said prescribed number of lots secured if said prescribed number of lots are secured, and reserving said processing device for processing of a number of lots that have been secured up to that point if said prescribed number of lots cannot be secured after a prescribed period of time.

17. The method of controlling a semiconductor manufacturing system according to claim 13, wherein said processing device includes a transmission portion connected to said semiconductor manufacturing system control device for transmitting information relating to lots to be processed to said semiconductor manufacturing system control device, and a lot processing portion connected to said lot reservation portion for simultaneously processing a prescribed number of lots for which a reservation is made;

said method of controlling a semiconductor manufacturing system further comprising the step of determining whether the lots to be processed are those for which said processing device has been reserved and deterring processing of said lots if said processing device is not reserved for said lots.

18. The method of controlling a semiconductor manufacturing system according to claim 13, wherein said semiconductor manufacturing system further includes an inspection device for inspecting lots processed by said processing device;

said method of controlling a semiconductor manufacturing system further comprising the step of deterring processing for said prescribed number of lots if a defect is found in the lots according to a result of inspection with said inspection device.

* * * * *